April 26, 1960

H. J. SHAFER 2,934,045

MULTIPLE SEAL FOR ROTARY FLUID MOTOR

Filed May 15, 1959

INVENTOR
HOMER J. SHAFER

BY

ATTORNEYS

April 26, 1960  H. J. SHAFER  2,934,045
MULTIPLE SEAL FOR ROTARY FLUID MOTOR
Filed May 15, 1959  2 Sheets-Sheet 2
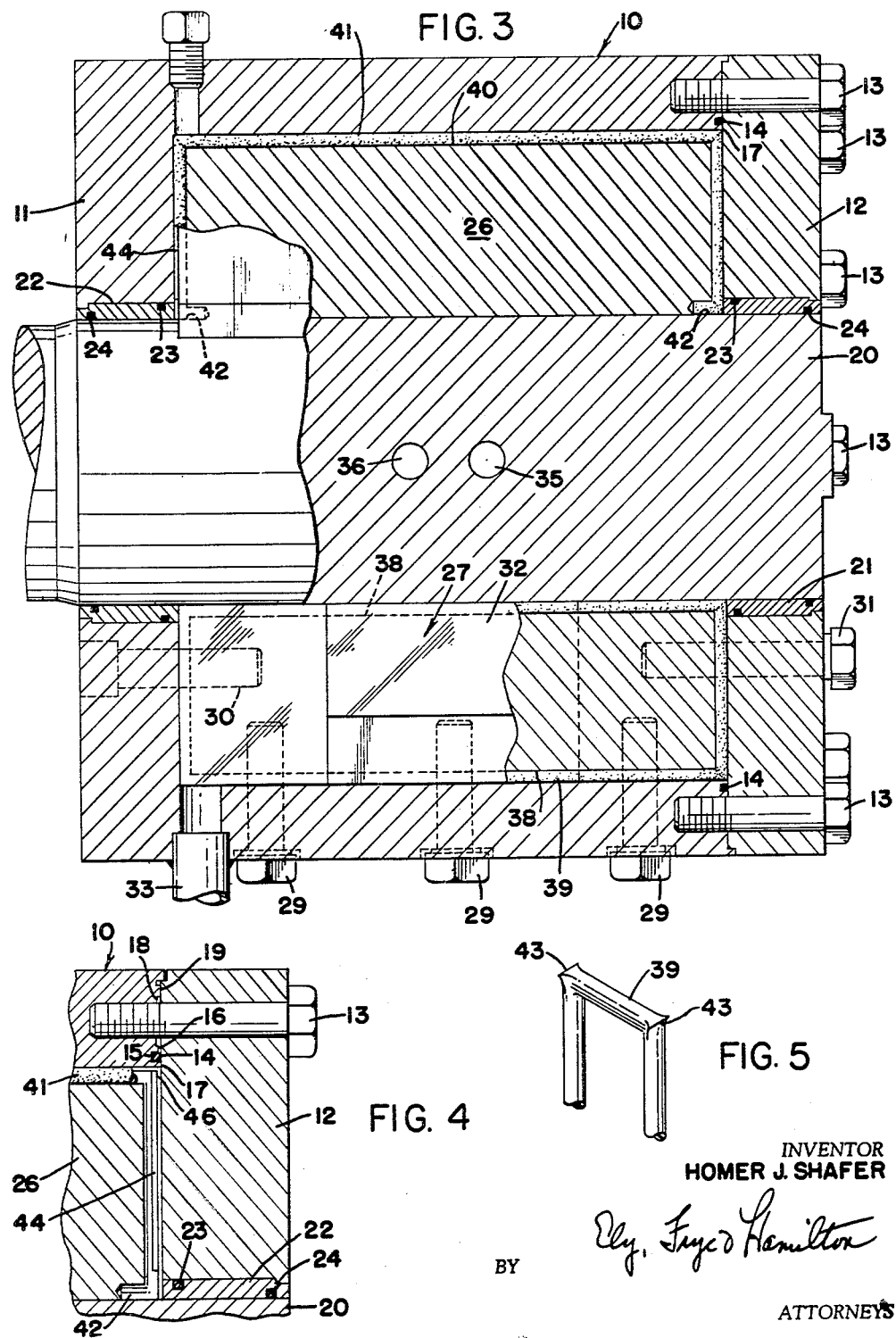
INVENTOR
HOMER J. SHAFER

United States Patent Office 2,934,045
Patented Apr. 26, 1960

2,934,045

MULTIPLE SEAL FOR ROTARY FLUID MOTOR

Homer J. Shafer, Mansfield, Ohio, assignor to Shafer Valve Company, Mansfield, Ohio, a corporation of Ohio Application May 15, 1959, Serial No. 813,497

8 Claims. (Cl. 121—99)

The invention relates generally to fluid motors of the rotary vane type, and more particularly to improved sealing means between the rotor and its cylindrical housing for maintaining substantially fluid-tight seals under high pressures.

Fluid or hydraulic motors employing rotary vanes require extremely efficient sealing means when operated under high pressures for moving heavy loads, such as large pipeline valves, because otherwise the hydraulic fluid in the motor leaks past the seals from the pressure chamber to the exhaust chamber. Continuous, resilient, rounded or O-ring seals having squared off outer corners and extending around the edges of the rotor vanes and the abutment stops therefor, such as shown in my prior U.S. Patent No. 2,778,338, provide greatly improved seals, but under high pressures of say 1000 pounds per square inch or more some seepage across the seals occurs.

Moreover, under such high pressures, the O-ring seals are greatly distorted in their grooves because of the high pressure differential between the pressure side and the exhaust side of the seal, resulting in increased wear and reduced life of the seals. A further disadvantage is that any foreign matter which gets under the highly pressurized seals tends to score the seal or the cylinder wall, or both.

In order to further prevent leakage from the pressure to the exhaust chamber, the O-ring seals in said Patent No. 2,778,338 extended radially across the entire ends of the vanes without any annular shoulder at the rotor shaft to take end thrust, said end thrust being normally absorbed by the seals. However, the high internal pressures tend to cause slight bowing of the end plates of the motor housing, in which case end thrust on the rotor shaft may compress the seals sufficiently to bring the outer corners of the metal vane into contact with an end plate, resulting in scoring of the end plate and subsequent leakage.

The main purpose of the present invention is to provide an improved multiple seal construction for rotary fluid motors which will minimize leakage from the pressure to the exhaust chamber; which will increase the life of the seals and reduce scoring caused by foreign matter entering under the seals; and which will prevent scoring of the housing end walls by contact with the outer corners of the vanes.

This purpose, together with other purposes which will appear from the following description, are accomplished by the improvements of the present invention, a preferred embodiment of which is shown by way of example in the accompanying drawings and described in detail herein. Various modifications and changes in details of construction are comprehended within the scope of the invention defined in the appended claims.

Referring to the drawings:

Fig. 3 is a sectional view substantially on line 3—3 of Fig. 1.

Fig. 4 is an enlarged fragmentary view similar to Fig. 3, with part of a sealing ring being broken away and removed.

Fig. 5 is a fragmentary perspective view of one of the sealing rings for the shoes or abutments in the motor.

Figure 1:
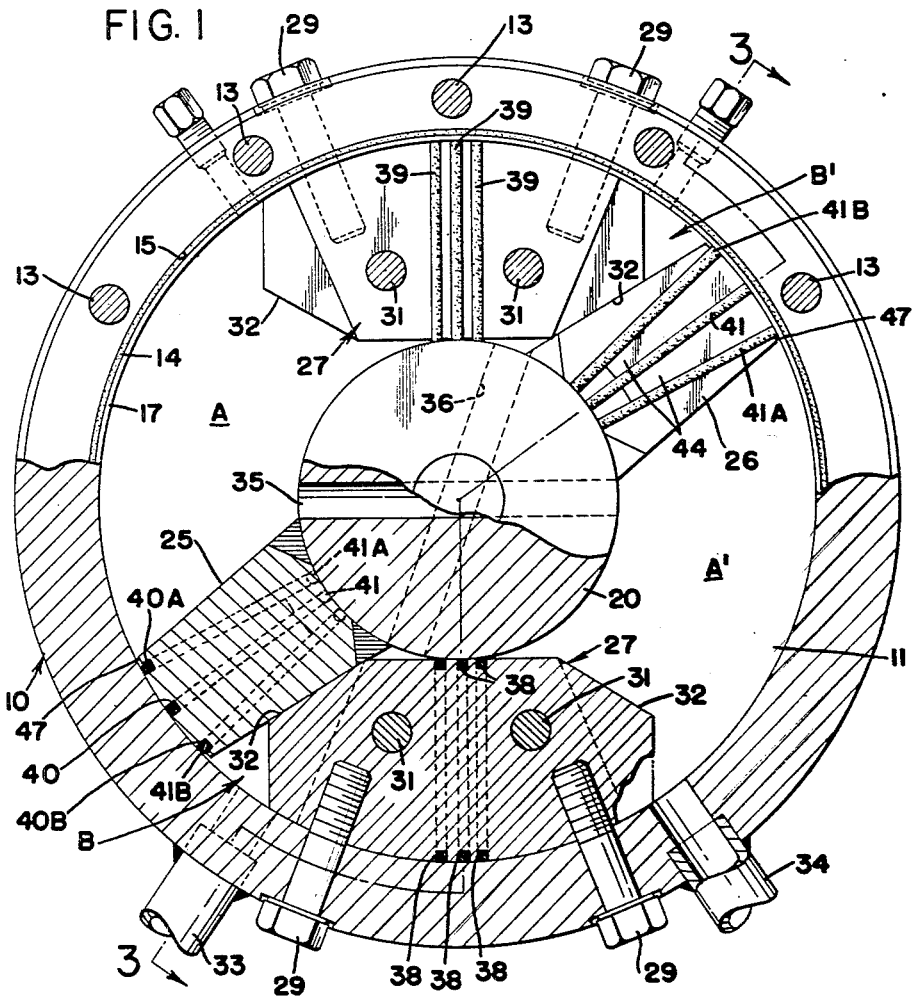
Fig. 1 is a plan view, partly in section, of a rotary vane motor embodying the invention.

The rotary vane motor preferably includes a cylindrical casing 10 having an integral end wall 11, closing one end of the casing, and a heavy circular plate 12 forming the opposite end wall and attached to the casing 10 by a circular row of screw studs 13. The joint between plate 12 and cylinder wall 10 is shown in detail in Fig. 4.

An O-ring 14 is located in a groove 15 in the end of cylinder wall 10 adjacent its inner edge, and the metal adjacent the outer edge of the groove is relieved .002" to .003", as indicated at 16, so that the studs 13 will draw the face of the end wall 12 into tight abutment with the annular shoulder 17 between the O-ring groove and the inner edge of the end wall. The face of wall 10 through which the studs 13 pass is further relieved as shown at 18, and an outer annular shoulder 19 is provided for abutting the face of end wall 12.

This construction allows that portion of the end wall 10 between the shoulders 17 and 19 to be pre-stressed by drawing down on the studs 13, to compensate for bowing of the end plate by high internal pressure within the motor which would otherwise cause the end wall 11 to move slightly away from the shoulder 17. Once this happens fluid from the motor chamber seeps into the O-ring groove 15 and follows annularly along the same from the pressure side to the exhaust side of the vane, regardless of how effective the seals on the vane are to prevent leakage across the vanes.

The rotor comprises a shaft 20 having its ends journaled in the end walls 11 and 12, and preferably having a constant or unchanging diameter at least where the rotor passes from the end walls into the motor chamber. As shown, the end walls may have bearing bushings 21 and 22 therein, the bushings carrying one O-ring 23 in sealing abutment with the end wall adjacent its inner face and another O-ring 24 in sealing abutment with the rotor shaft adjacent the end wall outer face.

The rotor vanes 25 and 26 are diametrically opposite each other and extend radially from the rotor shaft 20 across the annular chamber formed between the shaft and the cylindrical casing wall 10. The vanes may be integral with the shaft or separate plates welded thereto as indicated in Fig. 3. A pair of diametrically opposite abutment shoes or stops 27 is provided in the motor between the vanes 25 and 26, and the shoes are preferably detachably mounted in the casing by screw studs 29 passing radially through the wall 10, and by screw studs 30 and 31 passing through the end walls 11 and 12, respectively. As shown in Fig. 1, the shoes 27 preferably have beveled surfaces 32 on opposite sides which act as stops for the vanes 25 and 26. These surfaces terminate short of the ends of the shoes, as indicated in Fig. 3.

The annular chamber formed by the rotor shaft 20 and the walls 10, 11, and 12 of the motor is divided into two halves by the shoes 27, and each of those halves is divided by the vanes 25 and 26 into two chambers which vary in volume as the vanes are rotated. The chambers of one half are indicated at A and B, and the chambers of the other half are indicated at A' and B'. Pressure fluid conduits 33 and 34 connect through the wall 10 with chambers on opposite sides of one of the shoes 27, in this case chambers B and A, respectively. The A and A' chambers are interconnected, as are chambers B and B', so that fluid pressure may be supplied to or exhausted from only one chamber of each pair while being applied equally to both vanes to turn the rotor.

Interconnecting the chambers may be done in several ways. By way of example, I have shown cross ports through the rotor shaft, port 35 connecting chambers A and A', and port 36 connecting chambers B and B'.

Each of the abutment shoes 27 is provided along its top, bottom and inner and outer faces with a plurality of parallel continuous grooves of rectangular cross section in side-by-side relation, three grooves 38 being shown. In each of the grooves 38 is located an endless rectangular sealing ring 39 having a circular or rounded cross section except at the corners. The vanes 25 and 26 are similarly provided along their top, bottom and outer faces with a plurality of rectangular grooves, preferably three, and in each of the grooves is located a rectangular sealing ring.

The grooves in each vane are parallel along the outer face of the vane, and the middle groove 40 extends radially across the top and bottom faces. The two outer grooves 40A and 40B in the outer face are located adjacent the side edges of the vanes, and their top and bottom portions 40A' and 40B' extend substantially radially across the vane so that they converge somewhat toward the rotor shaft. This enables using three sealing rings 41, 41A and 41B of identical length in the grooves. At the rotor shaft, the grooves merge into shallow holes 42 parallel with the axis of the rotor which serve to anchor the ends of the rings.

The sealing rings 39, 41, 41A and 41B are preferably synthetic rubber or plastic sealing material which is resistant to oil or other pressure fluid used in the motor, and the relationship between the rounded cross section of the rings and the grooves of rectangular cross section is such that the rings are pressed in the grooves by the abutting walls and distorted to provide a pressure seal, according to well-known practice. The continuous sealing rings 39 and the U-shaped sealing strips 41, 41A and 41B are molded so as to have sharp, substantially rectangular portions 43 at their outer corners extending transversely of the seals, as shown in Fig. 5, to insure substantially perfect seals at the corners of the motor chamber. The squared corners are fully disclosed and claimed in my prior Patent No. 2,778,338.

The chambers A, A', B and B' may be filled with oil and the power to rotate the vanes 25 and 26 may be gas, air or liquid under pressure supplied to oil pressure tanks for forcing oil through one of the conduits 33 or 34 and exhausting oil out of the other conduit. To reverse the rotation of the rotor, the direction of flow through conduits 33 and 34 is reversed by suitable valve means.

In the top and bottom faces of the vanes 25 and 26, the lands between the grooves 40, 40A and 40B have insert plates 44 therein of bronze, as best shown in Fig. 4. The surfaces 45 between the grooves 40A and 40B and the side edges of the vanes are spaced from the end plates about 1/16 inch. The plates 44 extend to the outer corners of the grooves, as indicated at 46, and are normally spaced about .003 inch from the adjacent end walls when the seals 41, 41A and 41B are in sealing abutment therewith. However, under high internal pressures causing slight bowing of the end walls 11 and 12, end thrust on the rotor will compress the seals and allow contact of the outer corners of the insert plates with the adjacent end walls, and because these plates are bronze they will not score or damage the inner surfaces of the end plates. Moreover, the outwardly divergent or flared shape of the bronze inserts provides additional wearing area at their outer corners.

Figure 2:
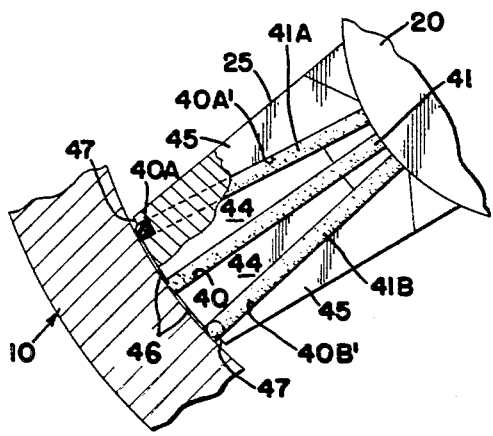
Fig. 2 is an enlarged fragmentary view similar to Fig. 1 of one of the vanes.

As best shown in Fig. 2, along the side edges of the vanes, the metal is relieved between the edge and the adjacent grooves 40A and 40B, as indicated at 47, to provide a clearance of about 1/16 inch between the inner cylindrical surface of wall 10 and the metal of the vane circumferentially outward of the grooves 40A and 40B. The clearance between the wall 10 and the outer face of the vane between the grooves 40A and 40B and the inner groove 40 is preferably about .002 inch. The purpose of the additional clearance is to cause the sealing ring 41A or 41B on the exhaust side of the vane to act as a wiper ring to push foreign material ahead of it without scoring the cylinder wall.

In the operation of the improved motor, assuming that fluid pressure of, say, 1000 pounds per square inch is introduced through conduit 33 and conduit 34 is connected to exhaust, the pressure in chambers B and B' is 1000 pounds and the pressure in chambers A and A' is substantially zero. Due to the high pressure, slight seepage will occur under the seals 41B, 41 and 41A toward the exhaust side of the vane.

For example, each seal 41B has 1000 pounds on its pressure side and the pressure on its exhaust side due to seepage may be about 500 pounds. The middle seal 41 then has 500 pounds on its pressure side and the pressure on its exhaust side may be about 200 pounds. The seal 41A then has 200 pounds on its pressure side and substantially zero on its exhaust side. It will be observed that, as compared with a single seal having 1000 pounds on its pressure side and zero on its exhaust side, the pressure differential on opposite sides of the three seals 41B, 41, and 41A is greatly reduced. Accordingly, the amount of distortion and wear on each of the seals is greatly reduced, and especially on the pressure side seal.

As the pressure rotates the vanes 25 and 26 clockwise, the seal 40A allows very little leakage because of the relatively low pressures to which it is subjected, and the clearance 47 on the exhaust side of the seal causes the seal to act as a wiper and push foreign material ahead of it. Consequently, no foreign material reaches the other two seals 41 and 41B to interfere with their sealing effectiveness or to score the cylinder wall.

When the flow through the conduits 33 and 34 is reversed, the seals 41B become the wiper seals on the exhaust sides of the vanes while the seals 41A are subjected to the high pressure on the opposite sides of the vanes. However, the foreign material pushed ahead of the seals 41A acting as wipers will not be traversed by any of the seals when the vanes are reversely rotated. Thus, substantially no foreign matter enters under the seals to reduce their effectiveness and score the cylinder wall.

The improved vane construction of the present invention provides a multiple seal for minimizing leakage while increasing the life of the seals, and for preventing scoring of the cylinder walls by foreign matter or by contact with the corners of the vanes.

What is claimed is:

1. In a rotary vane fluid motor including a cylindrical housing having transverse end walls, a rotor shaft journaled in said end walls having a vane oscillatable in said housing, said vane having opposite sides subjected to pressure and exhaust, and a stop in the cylinder limiting oscillation of said rotor, sealing means for said vane comprising a plurality of continuous grooves extending continuously around the outer and top and bottom faces of said vane and into abutment with the rotor shaft at their ends, resilient sealing strips extending continuously throughout said grooves and forming pressure seals between the faces of the vane and the adjacent housing walls, the metal of the vane being relieved between its opposite side edges and the adjacent grooves.

2. In a rotary vane fluid motor including a cylindrical housing having transverse end walls, a rotor shaft journaled in said end walls having a vane oscillatable in said housing, said vane having opposite sides subjected to pressure and exhaust, and a stop in the cylinder limiting oscillation of said rotor, sealing means for said vane comprising a plurality of continuous grooves extending continuously around the outer and top and bottom faces of said vane and into abutment with the rotor shaft at their ends, resilient sealing strips extending continuously throughout said grooves and forming pressure seals between the faces of the vane and the adjacent housing walls, the metal of the vane being relieved between its opposite side edges and the adjacent grooves, and the metal between said grooves in said top and bottom faces having bronze bearing inserts therein.

3. In a rotary vane fluid motor including a cylindrical housing having transverse end walls, a rotor shaft journaled in said end walls having a vane oscillatable in said housing, said vane having opposite sides subjected to pressure and exhaust, and a stop in the cylinder limiting oscillation of said rotor, sealing means for said vane comprising three continuous grooves extending continuously around the outer and top and bottom faces of said vane and into abutment with the rotor shaft at their ends, resilient sealing strips extending continuously throughout said grooves and forming pressure seals between the faces of the vane and the adjacent housing walls, the metal of the vane being relieved between its opposite side edges and the adjacent grooves.

4. In a rotary vane fluid motor including a cylindrical housing having transverse end walls, a rotor shaft journaled in said end walls having a vane oscillatable in said housing, said vane having opposite sides subjected to pressure and exhaust, and a stop in the cylinder limiting oscillation of said rotor, sealing means for said vane comprising three continuous grooves extending continuously around the outer and top and bottom faces of said vane and into abutment with the rotor shaft at their ends, resilient sealing strips extending continuously throughout said grooves and forming pressure seals between the faces of the vane and the adjacent housing walls, the metal of the vane being relieved between its opposite side edges and the adjacent grooves, and the metal between said grooves in said top and bottom faces having bronze bearing inserts therein.

5. In a rotary vane fluid motor including a cylindrical housing having transverse end walls, a rotor shaft journaled in said end walls having a vane oscillatable in said housing, said vane having opposite sides subjected to pressure and exhaust, and a stop in the cylinder limiting oscillation of said rotor, sealing means for said vane comprising three continuous grooves extending continuously around the outer and top and bottom faces of said vane and into abutment with said rotor shaft at their ends, said grooves being parallel in the outer face and substantially radial in the top and bottom faces, resilient sealing strips extending continuously throughout said grooves and forming seals with the adjacent housing walls, the metal of the vane being relieved between its opposite side edges and the adjacent grooves to provide increased clearance from the housing walls.

6. In a rotary vane fluid motor including a cylindrical housing having transverse end walls, a rotor shaft journaled in said end walls having a vane oscillatable in said housing, said vane having opposite sides subjected to pressure and exhaust, and a stop in the cylinder limiting oscillation of said rotor, sealing means for said vane comprising three continuous grooves extending continuously around the outer and top and bottom faces of said vane and into abutment with said rotor shaft at their ends, said grooves being parallel in the outer face and substantially radial in the top and bottom faces, resilient sealing strips extending continuously throughout said grooves and forming seals with the adjacent housing walls, the metal of the vane being relieved between its opposite side edges and the adjacent grooves to provide increased clearance from the housing walls, and the metal between said grooves in said top and bottom faces having bronze bearing inserts therein.

7. In a rotary vane fluid motor including a cylindrical housing having transverse end walls, a rotor shaft journaled in said end walls having a vane oscillatable in said housing, said vane having opposite sides subjected to pressure and exhaust, and a stop in the cylinder limiting oscillation of said rotor, sealing means for said vane comprising a plurality of continuous grooves extending continuously around the outer and top and bottom faces of said vane and into abutment with the rotor shaft at their ends, resilient sealing strips extending continuously throughout said grooves and forming pressure seals between the faces of the vane and the adjacent housing walls, the metal of the vane being relieved between its opposite side edges and the adjacent grooves, the metal between said grooves in said top and bottom faces having bronze inserts therein, one of said end walls being detachably secured to said housing, and said housing having an annular relieved portion along the interior of its joint with said detachable end wall, said relieved portion allowing pre-stressing the end wall to compensate for bowing of said end wall due to high internal pressure within said motor.

8. In a rotary vane fluid motor including a cylindrical housing having transverse end walls, a rotor shaft journaled in said end walls having a vane oscillatable in said housing, a stop in said cylinder limiting oscillation of said vane, and resilient sealing means around the outer faces of the vane for abutting the cylinder and end walls, one of said end walls detachably abutting said housing, said housing having an annular relieved portion along the interior of its joint with said detachable end wall, and a series of screw studs passing through said relieved portion and securing said detachable end wall to said housing, said studs pre-stressing said detachable end wall at said relieved portion to compensate for bowing of said end wall due to high internal pressure within said motor.

No references cited.

UNITED STATES PATENT OFFICE
CERTIFICATE OF CORRECTION

Patent No. 2,934,045                          April 26, 1960

Homer J. Shafer

It is hereby certified that error appears in the printed specification of the above numbered patent requiring correction and that the said Letters Patent should read as corrected below.

Column 2, line 28, for "wall 11" read -- wall 12 --.

Signed and sealed this 11th day of October 1960.

(SEAL)
Attest:

KARL H. AXLINE                                  ROBERT C. WATSON
Attesting Officer                              Commissioner of Patents